United States Patent
Takaoka (10) Patent No.: US 8,279,581 B2
(45) Date of Patent: Oct. 2, 2012

(54) ELECTROLYTIC SOLUTION FOR ELECTROLYTIC CAPACITOR AND ELECTROLYTIC CAPACITOR USING THE SAME

(75) Inventor: Ryoko Takaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 12/327,351

(22) Filed: Dec. 3, 2008

(65) Prior Publication Data

US 2009/0147444 A1 Jun. 11, 2009

(30) Foreign Application Priority Data

Dec. 7, 2007 (JP) ................................. 2007-316902

(51) Int. Cl.
*H01G 9/02* (2006.01)
(52) U.S. Cl. ........ 361/505; 361/500; 361/504; 361/512; 361/523; 361/527; 252/500; 429/304
(58) Field of Classification Search .......... 361/500–505, 361/508, 516, 525
See application file for complete search history.

(56) References Cited

U.S. PATENT DOCUMENTS

| | | | |
|---|---|---|---|
| 6,258,288 B1 | 7/2001 | Miyoshi et al. | |
| 6,765,785 B2 * | 7/2004 | Honda et al. | 361/525 |
| 6,839,222 B2 * | 1/2005 | Takaoka et al. | 361/512 |
| 7,390,441 B2 * | 6/2008 | Bollepalli | 252/511 |
| 7,459,103 B2 * | 12/2008 | Srinivas | 252/500 |
| 2003/0147202 A1 * | 8/2003 | Kudoh et al. | 361/523 |
| 2004/0184221 A1 * | 9/2004 | Kudoh et al. | 361/523 |
| 2004/0201064 A1 * | 10/2004 | Hirai et al. | 257/347 |
| 2005/0069780 A1 * | 3/2005 | Kinouchi et al. | 429/317 |
| 2006/0076541 A1 * | 4/2006 | Yoshida et al. | 252/500 |
| 2006/0249705 A1 * | 11/2006 | Wang et al. | 252/62.51 C |
| 2007/0051639 A1 * | 3/2007 | Mazur et al. | 205/666 |

FOREIGN PATENT DOCUMENTS

| | | |
|---|---|---|
| JP | 2000-068156 A | 3/2000 |
| JP | 2000-219653 A | 8/2000 |
| JP | 2005-005336 | 1/2005 |
| JP | 2005-166889 A | 6/2005 |

OTHER PUBLICATIONS

Machine translation of JP 2005-005336 previously filed in IDS dated Dec. 3, 2008.

\* cited by examiner

*Primary Examiner* — Courtney Smith
(74) *Attorney, Agent, or Firm* — Pearne & Gordon LLP (57) ABSTRACT

An electrolytic solution for an electrolytic capacitor includes a solvent and an electrolyte dissolved in the solvent. This electrolyte includes at least one of a carboxylic acid and a salt of the carboxylic acid. The carboxylic acid has a carboxyl group and at least one or more of substituents bonded to each terminal carbon of a straight main chain. The substituent bonded to the each terminal carbon of the main chain is hydrophilic, and/or a hydrophilic substituent is bonded to at least one of carbons other than the both terminal carbons of the main chain.

8 Claims, 3 Drawing Sheets

ELECTROLYTIC SOLUTION FOR ELECTROLYTIC CAPACITOR AND ELECTROLYTIC CAPACITOR USING THE SAME

BACKGROUND OF THE INVENTION

1. Field of the Invention

The present invention relates to an electrolytic capacitor having an excellent heat-resisting property, a high ripple current property, and a long lifetime, and to an electrolytic solution used for the electrolytic capacitor.

2. Background Art

In recent years, as electronic equipment has a smaller size and higher performance, an electrolytic capacitor used in a power circuit of electronic equipment is demanded to have high reliability such as high a heat-resisting property, a high ripple current property, and a long lifetime. In particular, an electrolytic solution that is one of main components of an electrolytic capacitor is demanded to have excellent properties when it is used in a high temperature environment.

Figure 3:
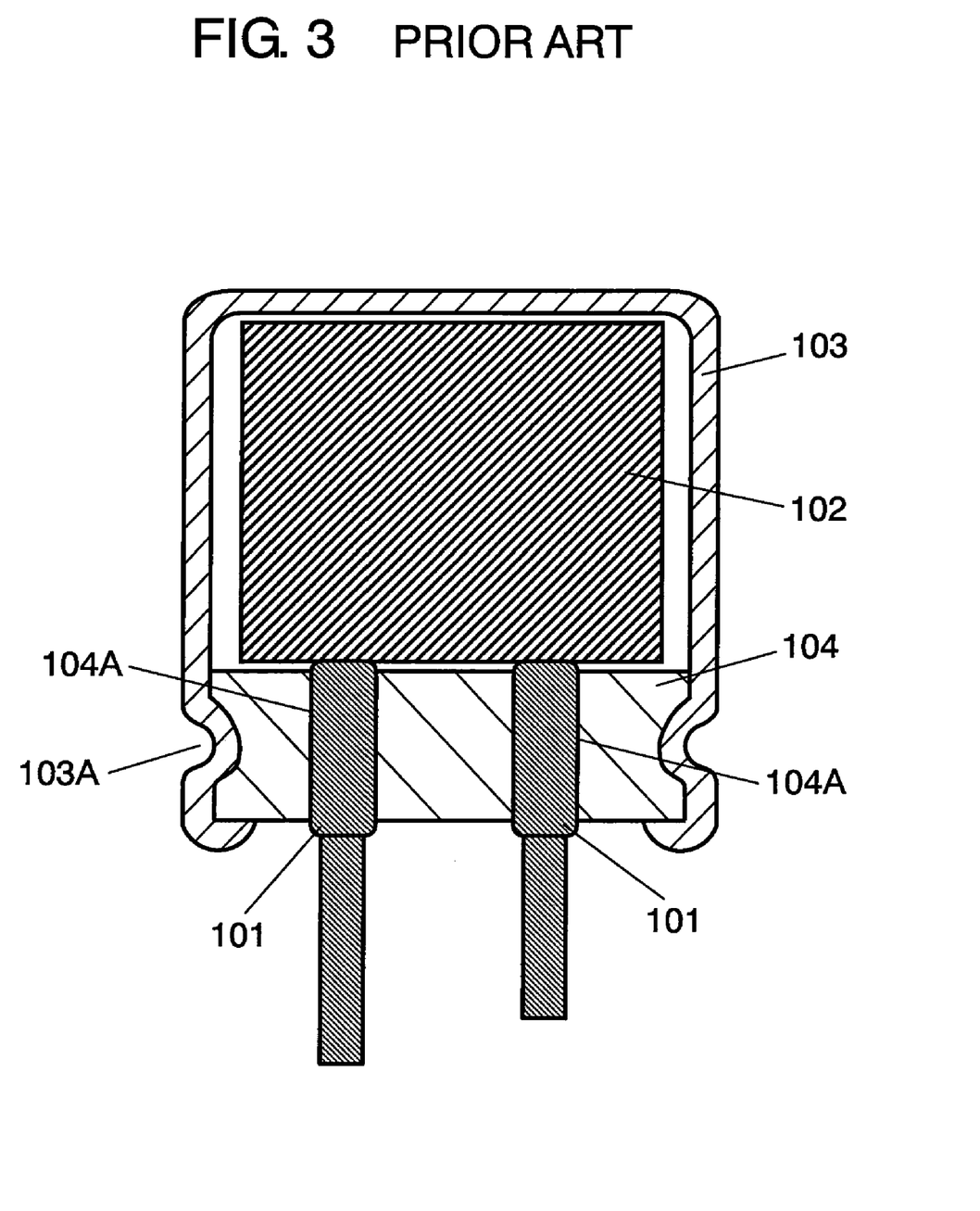
FIG. 3 is a sectional view showing a radial-lead type aluminum electrolytic capacitor as one example of a conventional electrolytic capacitor.

FIG. 3 is a sectional view showing a radial-lead type aluminum electrolytic capacitor that is one of conventional electrolytic capacitors. This aluminum electrolytic capacitor includes capacitor element 102, cylindrical case 103 having a bottom, sealing material 104, and an electrolytic solution (not shown).

Capacitor element 102 is formed by winding an anode foil and a cathode foil with a separator interposed therebetween (not shown). Lead wires 101 for external lead-out are connected to the anode foil and the cathode foil, respectively. Case 103 contains capacitor element 102 impregnated with the electrolytic solution. Sealing material 104 is provided with through-holes 104A through which lead wires 101 are inserted. Sealing material 104 seals an opening of case 103.

Furthermore, the electrolytic solution includes a carboxylic acid having a carboxyl group and an alkyl group as a substituent on each terminal carbon of a main chain as shown in general formula (A).

("m" is a natural number)

A general electrolytic solution may include a compound having a carboxyl group as an electrolyte. In such a case, this carboxyl group tends to undergo an esterification reaction with alcohol such as ethylene glycol as a solvent in a high temperature environment. The reaction product subsequently undergoes an amidation reaction with ammonia, amine, or the like, contained in a general electrolytic solution. Due to the thus produced compound, the electric conductivity of the electrolytic solution is considerably reduced over time. As a result, the equivalent series resistance (hereinafter, referred to as "ESR") of the electrolytic capacitor is remarkably increased, and therefore the ripple current property cannot be improved and the lifetime cannot be extended.

On the contrary, a carboxylic acid having a structure represented by general formula (A) has a carboxyl group and alkyl groups (R1 and R2) as a substituent on both terminal carbons of the main chain. Therefore, in an electrolytic solution including such carboxylic acid as an electrolyte, the alkyl group is adjacent to the carboxyl group to serve as a steric hindrance, thus inhibiting the reaction between the carboxyl group and alcohol such as ethylene glycol as a solvent. Therefore, the above-mentioned esterification reaction and amidation reaction are suppressed. Consequently, the reduction over time in the electric conductivity of the electrolytic solution can be prevented in a high temperature environment. As a result, the increase in the ESR of an electrolytic capacitor is suppressed, and an electrolytic capacitor having a high heat-resisting property, a high ripple current property, and a long lifetime can be provided. Such a conventional technology is disclosed in, for example, Japanese Patent Application Unexamined Publication No. 2005-5336.

However, even when an electrolytic solution including a carboxylic acid having the structure represented by general formula (A) as an electrolyte is applied, it is not possible to sufficiently suppress the increase over time in the ESR in a high temperature environment. In particular, the change in the ESR in a low frequency region of about 50 to 120 Hz is still large, so that an electrolytic capacitor having a high heat-resisting property, a high ripple current property and a long lifetime cannot be realized.

SUMMARY OF THE INVENTION

The present invention is an electrolytic capacitor in which the increase over time in the ESR in a high temperature environment is suppressed and which has a high heat-resisting property, a high ripple current property and a long lifetime, and an electrolytic solution for realizing the electrolytic capacitor. The electrolytic solution for the electrolytic capacitor of the present invention includes a solvent, and an electrolyte dissolved in the solvent. The electrolyte includes at least one of a carboxylic acid and a salt of the carboxylic acid. The carboxylic acid has a straight main chain having terminal carbons. A carboxyl group and at least one or more substituents are bonded to each of the both terminal carbons. In addition, the substituent bonded to a terminal carbon of the main chain is hydrophilic and/or a hydrophilic substituent is bonded to at least one of carbons other than the both terminal carbons of the main chain.

In the electrolytic capacitor using the electrolytic solution of the present invention, the substituent bonded to the terminal carbon of the main chain is adjacent to a carboxyl group so as to form a steric hindrance, thus suppressing the esterification reaction and the amidation reaction of a carboxyl group. Therefore, the reduction over time in the electric conductivity is prevented in a high temperature environment. Furthermore, the substituent bonded to the terminal carbon of the main chain is hydrophilic and/or a hydrophilic substituent is bonded to at least one of the carbons other than both terminal carbons of the main chain. That is to say, a hydrophilic substituent is bonded to at least one of the carbons of the main chain. Thus, the hydrophobic property of a compound produced during the progress of the esterification reaction and the amidation reaction of a carboxyl group can be reduced. Therefore, the compound does not precipitate into the electrolytic solution, so that it is not accumulated on the electrode foil interface. As a result, in the electrolytic capacitor, the increase over time in the ESR in a high temperature environment can be suppressed.

DETAILED DESCRIPTION OF PREFERRED EMBODIMENT

Figure 1:
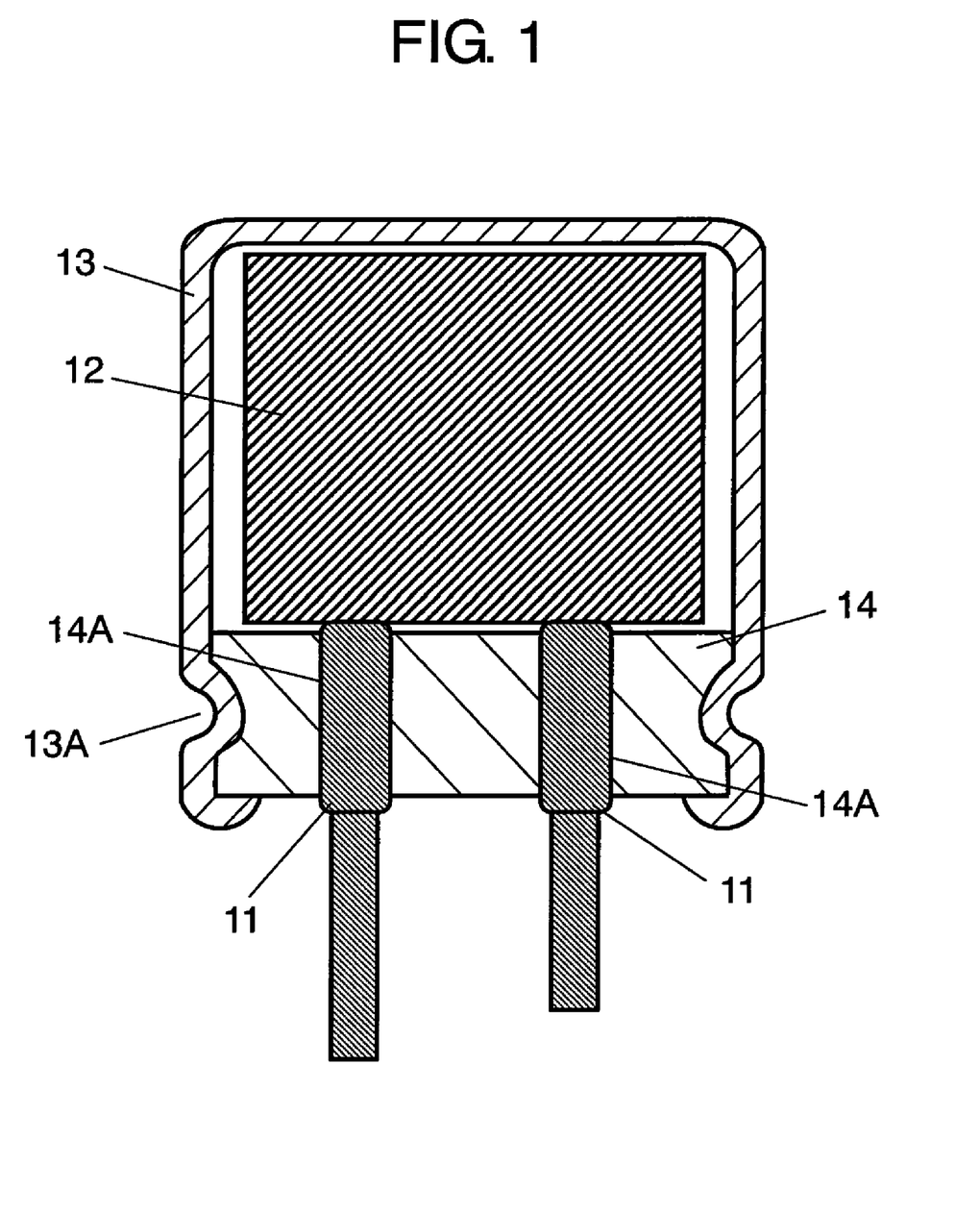
FIG. 1 is a sectional view showing a radial-lead type aluminum electrolytic capacitor as an example of an electrolytic capacitor in accordance with an embodiment of the present invention.
Figure 2:
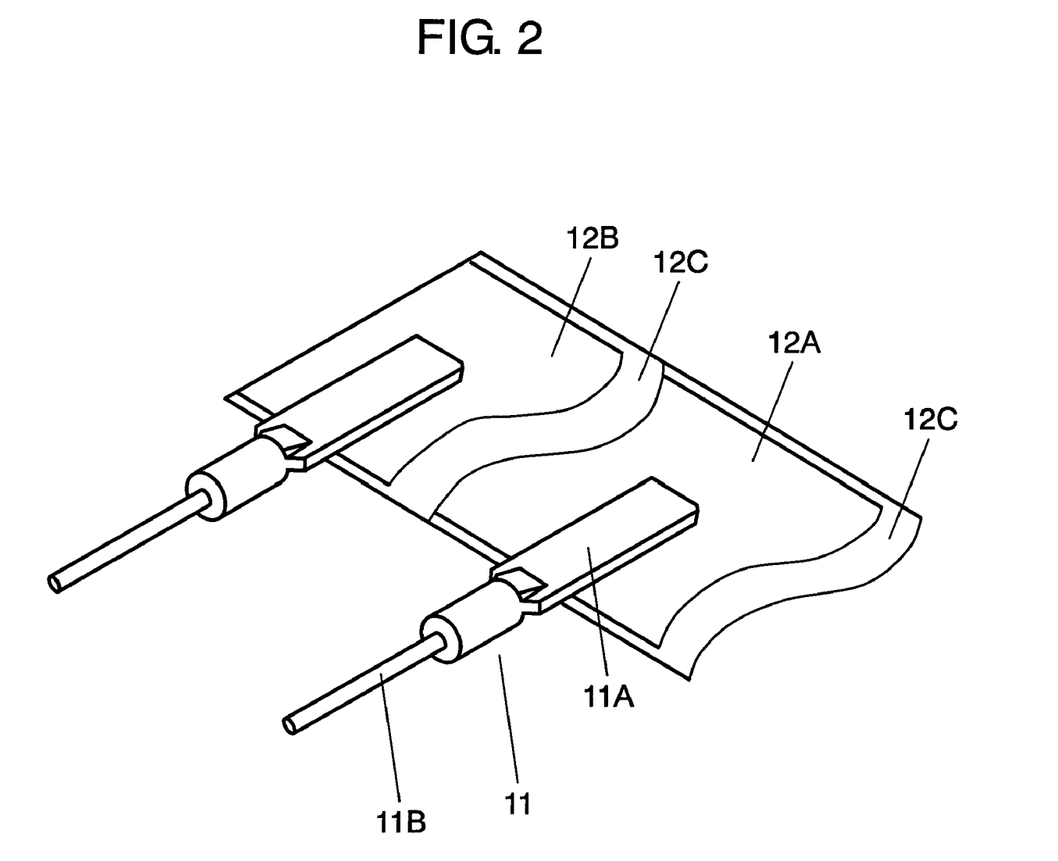
FIG. 2 is a development perspective view showing a capacitor element of the aluminum electrolytic capacitor shown in FIG. 1.

FIG. 1 is a sectional view showing a configuration of a radial-lead type aluminum electrolytic capacitor as an example of an electrolytic capacitor in accordance with an embodiment of the present invention. FIG. 2 is a development perspective view showing a capacitor element of this aluminum electrolytic capacitor.

This aluminum electrolytic capacitor includes capacitor element 12, cylindrical case 13 having a bottom, and sealing body 14. As shown in FIG. 2, capacitor element 12 includes anode foil 12A, cathode foil 12B, separator 12C, and a pair of lead wires 11 that are electrode lead-out parts. Each of anode foil 12A and cathode foil 12B has a dielectric layer of an oxide film on the surface thereof. Separator 12C is interposed between anode foil 12A and cathode foil 12B and prevents them from being brought into contact with each other. Lead wire 11 has end portions 11A and 11B, and end portion 11A is connected to either anode foil 12A or cathode foil 12B. Anode foil 12A and cathode foil 12B are wound via separator 12C in a roll shape so as to form a substantially cylindrical shape, and the winding end on the outer peripheral side surface is fixed by, for example, an insulating tape (not shown). Thus, capacitor element 12 is produced.

Case 13 contains capacitor element 12 impregnated with an electrolytic solution (not shown). Sealing body 14 is provided with through-holes 14A through which lead wires 11 are inserted. Sealing body 14 is made of an elastic material such as rubber, disposed in an opening of case 13, and compressed by drawn part 13A that is provided by machining case 13 on the outer peripheral surface. The opening of case 13 is thus sealed.

The electrolytic solution includes a solvent and an electrolyte. As the solvent, the following solvents are used singly or in combination of two or more thereof: water, an alcohol solvent (ethylene glycol, propylene glycol, 1,4-butanediol, glycerine, polyoxyalkylene polyol, and the like), an amide solvent (N-methylformamide, N,N-dimethylformamide, N-methyl acetamide, N-methylpyrrolidinone, and the like), an ether solvent (methylal, 1,2-dimethoxyethane, 1-ethoxy-2-methoxy ethane, 1,2-diethoxyethane, and the like), a nitrile solvent (acetonitrile, 3-methoxy propionitrile, and the like), a furan solvent (2,5-dimethoxy tetrahydrofuran and the like), a sulfolane solvent (sulfolane, 3-methyl sulfolane, 2,4-dimethyl sulfolane, and the like), a lactone solvent (γ-butyrolactone, γ-valerolactone, δ-valerolactone, 3-methyl-1,3-oxazolidine-2-one, 3-ethyl-1,3-oxazolidine-2-one, and the like), an imidazolidinone solvent (1,3-dimethyl-2-imidazolidinone and the like), a carbonate solvent (propylene carbonate, ethylene carbonate, diethyl carbonate, styrene carbonate, dimethyl carbonate, methyl ethyl carbonate, and the like), and a pyrolidone solvent. Among them, it is desirable that ethylene glycol, propylene glycol, diethylene glycol, γ-butyrolactone, water, and sulfolane are used singly or in combination two or more thereof.

On the other hand, the electrolyte includes carboxylic acid and/or a salt thereof. In detail, the electrolyte includes a carboxylic acid in which a carboxyl group and at least one or more substituents are bonded to each of terminal carbons of a straight main chain and/or a salt thereof. A hydrophilic substituent is bonded to at least one of the carbons of the main chain. An example of the specific structure may include one represented by general formula (B).

("m" and "n" are natural numbers)

In carboxylic acid represented by general formula (B), substituents R3 and R4 are bonded to carbons located at both terminals of the main chain, that is, carbons at α positions of two carboxyl groups, respectively. Substituents R3 and R4 are adjacent to the carboxyl group respectively, forming a steric hindrance to inhibit the esterification reaction of the carboxyl group. Specific examples of substituents R3 and R4 include a hydroxyl group, a carboxyl group, an acyl group, a carboxy ester group, an alkylether group, a hydrocarbon group having two to four carbon atoms, and the like. Both substituents may be the same as or different from each other.

Furthermore, substituent R5 is bonded to a carbon other than the both terminal carbons of the main chain. Specific examples of substituent R5 may also include a hydroxyl group, a carboxyl group, an acyl group, a carboxy ester group, an alkylether group, a hydrocarbon group having two to four carbon atoms, and the like. R5 may be the same as or different from substituents R3 or R4. Note here that substituents R5 may be bonded to a plurality of carbons other than both terminal carbons of the main chain. Furthermore, when each of R3, R4 and R5 is a hydrocarbon group, is may be a saturated or an unsaturated hydrocarbon group, or may be a branched hydrocarbon group. However, at least one of the substituents bonded to the carbons of the main chain is a hydrophilic substituent. In other words, in general formula (B), at least one of the substituents R3, R4, and R5 is a hydrophilic substituent. Specific examples of the hydrophilic substituent may include a hydroxyl group, a carboxyl group, an acyl group, a carboxy ester group, an alkylether group, and the like.

Note here that substituents R3 and R4 functions as a steric hindrance to the adjacent carboxyl group and at least one of them may be hydrophilic. In this case, substituent R5 is not always necessarily.

Furthermore, in general formula (B), "m" and "n" are natural numbers and the total number of carbon atoms in general formula (B) is preferably in the range from 7 to 30.

Furthermore, carboxylic acid represented by general formula (B) is a secondary carboxylic acid having substituents R3 and R4 at each terminal carbon of the main chain. However, it may be tertiary carboxylic acid represented by general formula (C).

("m" and "n" are natural numbers)

In the tertiary carboxylic acid represented by general formula (C), substituents R3 and R6 are bonded to the carbon located at one of the terminals of the main chain, that is, the carbon at α position of one of the two carboxyl groups, and substituents R4 and R7 are bonded to the carbon at the other α position. That is to say, two each of substituents adjacent to the carboxyl group are bonded to each of the two carbons located at both terminals of the main chain. These substituents inhibit the esterification and amidation reactions of the carboxyl group. The effect as a steric hindrance is larger than that in the secondary carboxylic acid. Similar to substituent R3 and R4, specific examples of substituent R6 and R7 may also include a hydroxyl group, a carboxyl group, an acyl group, a carboxy ester group, an alkylether group, a hydrocarbon group having two to four carbon atoms, and the like. R3, R4, R6 and R7 may be the same as or different from each other.

Furthermore, substituent R5 is bonded to a carbon other than the both terminal carbons of the main chain. Also, specific examples of substituent R5 may include a hydroxyl group, a carboxyl group, an acyl group, a carboxy ester group, an alkylether group, a hydrocarbon group having two to four carbon atoms, and the like. R5 may be the same as or different from substituents R3, R4, R6, and R7. Furthermore, substituents R5 may be bonded to a plurality of carbons other than the carbons at both terminals of the main chain. When each of R3, R4, R5, R6, and R7 is a hydrocarbon group, it may be a saturated or an unsaturated hydrocarbon group, or may be a branched hydrocarbon group. However, at least one of the substituents bonded to the carbons of the main chain is a hydrophilic substituent. In other words, in general formula (C), at least one of the substituents R3, R4, R5, R6, and R7 is a hydrophilic substituent. Specific examples of the hydrophilic substituent may include a hydroxyl group, a carboxyl group, an acyl group, a carboxy ester group, an alkylether group, and the like.

Note here that substituents R3, R4, R6, and R7 functions as a steric hindrance to the adjacent carboxyl group and at least one of them may be hydrophilic. In this case, substituent R5 is not always necessarily.

Furthermore, in general formula (C), "m" and "n" are natural numbers and the total number of carbon atoms in general formula (C) is preferably in the range from 7 to 30.

Furthermore, as a salt of the carboxylic acid represented by general formula (B) or general formula (C), ammonium salt or amine salt can be suitably used. Thereby, high electric conductivity can be achieved. Furthermore, the esterification reaction with respect to ethylene glycol and the like can be suppressed, and the reduction of the electric conductivity at high temperatures can be prevented.

An example of the ammonium salt may include quaternary ammonium salt in addition to normal ammonium salt. Specific examples may include tetramethyl ammonium salt, trimethyl ethyl ammonium salt, dimethyl diethyl ammonium salt, triethyl methyl ammonium salt, and the like. An example of the amine salt may include primary amine salt, secondary amine salt, and tertiary amine salt. Specific examples of the primary amine salt may include methyl amine salt, ethyl amine salt, ethylenediamine salt, and the like. Specific examples of the secondary amine salt may include dimethyl amine salt, diethyl amine salt, methyl ethyl amine salt, methyl propyl amine salt, and the like. Specific examples of the tertiary amine salt may include trimethyl amine salt, dimethyl ethyl amine salt, dimethyl propyl amine salt, diethyl methyl amine salt, triethyl amine salt, diethyl propyl amine salt, and the like.

Note here that for the purpose of improving the sparking voltage, improving the conversion property, controlling the generation of gas, and the like, the electrolytic solution may contain additives to the degree that the features of the electrolytic solution of the present invention are not impaired. Examples of such additives may include dibasic acid such as azelaic acid, 1,6-decane dicarboxylic acid, sebacic acid, 5,6-decane dicarboxylic acid, 1,7-octane dicarboxylic acid, organic acid such as benzoic acid, inorganic acid such as boric acid, and the like. Furthermore, in order to improve the thermal stability or withstand voltage, ammonium borate, mannitol, and the like, may be added singly or in combination thereof.

Next, a method for preparing the electrolytic solution configured as mentioned above in this embodiment is briefly described. Firstly, the above-mentioned alcohol solvent such as ethylene glycol is prepared and this is used as a solvent. Next, an electrolyte is prepared as a solute. This electrolyte is a carboxylic acid having a carboxyl group and at least one or more of substituents on each terminal carbon of the main chain and in which at least one of the carbons of the main chain has a hydrophilic substituent, and/or a salt of the carboxylic acid. This electrolyte is dissolved in the above-mentioned solvent. Specifically, compounds shown by general formula (B) and general formula (C), and the like, are used.

Then, a method for manufacturing a radial-lead type aluminum electrolytic capacitor as an example of the electrolytic capacitor of this embodiment is described with reference to FIGS. 1 and 2.

Firstly, as shown in FIG. 2, anode foil 12A, cathode foil 12B and separator 12C are cut in predetermined width and length. Then, end portions 11A of lead wires 11 are connected thereto by, for example, swaging or an ultrasonic wave method. Thereafter, anode foil 12A and cathode foil 12B are wound with separator 12C interposed therebetween into a roll shape so as to form a substantially cylindrical shape, and the winding end on the outer peripheral side surface is fixed by, for example, an insulating tape (not shown). Thus, capacitor element 12 is produced.

Next, as shown in FIG. 1, capacitor element 12 is contained in case 13 together with the electrolytic solution prepared by the above-mentioned method. On the other hand, the pair of lead wires 11 lead out from capacitor element 12 are inserted into pair of through holes 14A provided in sealing body 14, respectively. In this state, sealing body 14 is disposed in an opening of case 13 and the other end portion 11B of lead wire 11 is derived to the outside.

Thereafter, case 13 is machined (swaged) from the outer peripheral side surface thereof to form drawn part 13A. Thus, the opening of case 13 is sealed.

Then, a voltage is applied between end portions 11B of lead wires 11 derived to the outside, and an electrochemical treatment is carried out. Thus, a radial-lead type aluminum electrolytic capacitor is produced.

Note here that the electrochemical treatment may be carried out appropriately after capacitor element 12 is impregnated with an electrolytic solution and before and/or after the opening of case 13 is sealed.

The electrolytic solution of the present embodiment includes carboxylic acid in which a carboxyl group and at least one or more substituents are bonded to each terminal carbon of the main chain and/or a salt thereof. This substituent is adjacent to a carboxyl group so as to form a steric hindrance, thus suppressing the esterification reaction and the amidation reaction of the carboxyl group. Therefore, in a high temperature environment, the reduction over time in the electric conductivity of the electrolytic solution is prevented. Furthermore, a hydrophilic substituent is bonded to at least one of the carbons of the main chain. Therefore, the hydrophobic property of a compound generated during the progress of the esterification reaction and the amidation reaction of a carboxyl group can be reduced. The precipitation of the compound into the electrolytic solution is suppressed. Therefore, the increase over time in the ESR of the electrolytic capacitor is further prevented in a high temperature environment.

Furthermore, it is preferable that a substituent to be bonded to each terminal carbon of the main chain together with a carboxyl group is any one of a hydrocarbon group having two to four carbon atoms, a hydroxyl group, a carboxyl group, an acyl group, a carboxy ester group, and an alkylether group. Thus, the substituent functions as a steric hindrance at the location adjacent to a carboxyl group bonded to each terminal carbon of the main chain, thereby effectively preventing the esterification and the amidation reaction.

Furthermore, it is preferable that the hydrophilic substituent is any one of a hydroxyl group, a carboxyl group, an acyl group, a carboxy ester group, and an alkylether group. Thus, even if the esterification and amidation reactions of carboxylic acid progress, the hydrophobic property of the compound produced by these reactions can be reduced effectively, thus suppressing the precipitation of the compound into the electrolytic solution.

Furthermore, a hydroxyl group, a carboxyl group, an acyl group, a carboxy ester group, an alkylether group function as a steric hindrance at the position adjacent to the carboxyl group bonded to the each terminal carbon of the main chain and show the hydrophilic property. Therefore, the hydrophobic property of a compound produced by the esterification and amidation reactions is suppressed so as to prevent the precipitation in addition to suppressing the esterification reaction and the amidation reactio. Therefore, both two functions can be exhibited and the effects of the present invention can be rationally exhibited.

Note here that even when a hydroxyl group is used as a substituent for a steric hindrance and/or a hydrophilic substituent, the above-mentioned effects of the present invention can be exhibited. However, since hydrogen is bonded to oxygen with high electronegativity. Therefore, the carboxyl group or the like bonded to the carbon of the main chain tends to undergo hydrogen bonding within or between molecules, so that there is a limit to increasing the electric conductivity of the electrolytic solution.

On the other hand, a carboxyl group, an acyl group, a carboxy ester group, and an alkylether group do not undergo a hydrogen bonding within or between molecules. Therefore, the electric conductivity of the electrolytic solution can be increased.

Furthermore, the carboxy ester itself is already esterified, so that the esterification reaction does not proceed. Therefore, as compared with the case where a carboxyl group and the like is used as a substituent for a steric hindrance and/or a hydrophilic substituent, the effect of suppressing the esterification reaction and the amidation reaction is large.

The electrolytic capacitor of this embodiment includes the above-mentioned electrolytic solution. Therefore, the reduction over time in the electric conductivity of the electrolytic solution can be prevented in a high temperature environment, and furthermore a compound produced by the progress of the esterification reaction and the amidation reaction of a carboxyl group is not accumulated on the interface of the electrode foils. Therefore, the increase of the electric resistance on the interface between anode foil 12A or cathode foil 12B and the electrolytic solution is suppressed. As a result, the increase over time in the ESR in a high temperature environment can be suppressed. That is to say, a heat-resisting property and a ripple current property of the electrolytic capacitor are improved, and a lifetime can be extended.

The exterior form of the electrolytic capacitor of this embodiment is not particularly limited as long as it contains capacitor element 12 impregnated with the above-mentioned electrolytic solution. For example, the opening of case 13 may be sealed with an insulating resin such as epoxy resin instead of sealing body 14 made of an elastic material such as rubber.

Furthermore, an insulating resin plate having an elastic material such as rubber on the outer periphery may be used instead of sealing body 14 so as to seal the opening of case 13. In this case, this insulating resin plate may be provided with joining portions for joining lead wires 11 of capacitor element 12 and outer terminals, respectively.

Furthermore, insulating coating resin made of, for example, epoxy resin may be used instead of case 13 so as to cover capacitor element 12 impregnated with the above-mentioned electrolytic solution. In this case, lead wires 11 may be derived out of the exterior material.

Hereinafter, a specific example of the electrolytic solution of the present invention is described. Firstly, carboxylic acids as an electrolyte to be used in the following examples are shown in Table 1. Note here that such compounds can be synthesized by introducing a substituent into a main chain in advance based on a method disclosed in, for example, Japanese Patent Application Unexamined Publication No. 2000-219653.

TABLE 1

| Compound No. | Structure |
|---|---|
| A1 | HOOC—CH(C$_2$H$_5$)—CH$_2$—CH(OH)—CH$_2$—CH$_2$—CH(C$_2$H$_5$)—COOH |
| A2 | HOOC—CH(COOH)—CH$_2$—CH$_2$—CH$_2$—CH$_2$—CH(COOH)—COOH |
| A3 | HOOC—CH(COCH$_3$)—CH$_2$—CH$_2$—CH$_2$—CH$_2$—CH(COCH$_3$)—COOH |
| A4 | HOOC—CH(COOCH$_3$)—CH$_2$—CH$_2$—CH$_2$—CH$_2$—CH(COOCH$_3$)—COOH |

TABLE 1-continued

| Compound No. | Structure |
|---|---|
| A5 | HOOC—CH(OC$_2$H$_5$)—CH$_2$—CH$_2$—CH$_2$—CH$_2$—CH(OC$_2$H$_5$)—COOH |
| A6 | HOOC—C(COOCH$_3$)(COOCH$_3$)—CH$_2$—CH$_2$—CH$_2$—CH$_2$—C(COOCH$_3$)(COOCH$_3$)—COOH |
| A7 | HOOC—CH$_2$—CH$_2$(C$_2$H$_5$)—CH(OH)—CH$_2$—CH$_2$—CH$_2$(COOCH$_3$)—COOH |
| A8 | HOOC—CH(C$_2$H$_5$)—CH$_2$—CH(OH)—CH$_2$—CH$_2$—CH$_2$—CH$_2$—CH$_2$—CH(C$_2$H$_5$)—COOH |
| A9 | HOOC—CH(COOCH$_3$)—CH$_2$—CH$_2$—CH$_2$—CH$_2$—CH(CH(CH$_3$)$_2$)—COOH |
| B1 | HOOC—CH(C$_2$H$_5$)—CH$_2$—CH$_2$—CH$_2$—CH$_2$—CH(C$_2$H$_5$)—COOH |
| B2 | HOOC—CH$_2$—CH$_2$—CH(OH)—CH$_2$—CH$_2$—CH$_2$—COOH |

The electrolytic solution of sample A1 is prepared as follows. Firstly, compound A1 shown in Table 1, ammonium borate, mannitol, and water are mixed with ethylene glycol. Then, this mixture is heated to 100° C. or less and dissolved. Thereafter, the mixture is cooled to the ordinary temperature. The mixing weight ratio of ethylene glycol:compound A1:ammonium borate:mannite:water is 84:10:2:2:2.

Compound A1 is a secondary carboxylic acid having six carbon atoms in the main chain, in which a carboxyl group (—COOH) is bonded to each terminal carbon, an ethyl group (—C$_2$H$_5$) is bonded to the each terminal carbon of the main chain, and a hydroxyl group (—OH) is bonded to one of the carbons of the main chain.

The electrolytic solution of sample A2 is prepared in the same way as the electrolytic solution of sample A1 except that compound A2 is used instead of compound A1.

Compound A2 is a secondary carboxylic acid having six carbon atoms in the main chain, in which a carboxyl group (—COOH) bonded to each terminal carbon, and a further carboxyl group (—COOH) is bonded to the each terminal carbon of the main chain.

The electrolytic solution of sample A3 is prepared in the same way as the electrolytic solution of sample A1 except that compound A3 is used instead of compound A1.

Compound A3 is a secondary carboxylic acid having six carbon atoms in the main chain, in which a carboxyl group (—COOH) is bonded to each terminal carbon, and a kind of acyl group (—COCH$_3$) is bonded to the each terminal carbon of the main chain.

The electrolytic solution of sample A4 is prepared in the same way as the electrolytic solution of sample A1 except that compound A4 is used instead of compound A1.

Compound A4 is a secondary carboxylic acid having six carbon atoms in the main chain, in which a carboxyl group (—COOH) is bonded to each terminal carbon, and a kind of carboxy ester group (—COOCH$_3$) is bonded to the each terminal carbon of the main chain.

The electrolytic solution of sample A5 is prepared in the same way as the electrolytic solution of sample A1 except that compound A5 is used instead of compound A1.

Compound A5 is a secondary carboxylic acid having six carbon atoms in the main chain, in which a carboxyl group (—COOH) is bonded to each terminal carbon, and a kind of alkyl ether (—OC$_2$H$_5$) is bonded to the each terminal carbon of the main chain.

The electrolytic solution of sample A6 is prepared in the same way as the electrolytic solution of sample A1 except that compound A6 is used instead of compound A1.

Compound A6 is ternary carboxylic acid having six carbon atoms in the main chain, in which a carboxyl group (—COOH) is bonded to each terminal carbon, and two each of kind of carboxy ester groups (—COOCH$_3$) are bonded to the each terminal carbon of the main chain.

The electrolytic solution of sample A7 is prepared in the same way as the electrolytic solution of sample A1 except that compound A7 is used instead of compound A1.

Compound A7 is a secondary carboxylic acid having six carbon atoms in the main chain, in which a carboxyl group (—COOH) is bonded to each terminal carbon, an ethyl group (—C$_2$H$_5$) is bonded to one of the terminal carbons of the main chain, and a kind of carboxy ester group (—COOCH$_3$) is bonded to the other terminal carbon. In addition, a hydroxyl group (—OH) is bonded to one of the carbons of the main chain.

The electrolytic solution of sample A8 is prepared in the same way as the electrolytic solution of sample A1 except that compound A8 is used instead of compound A1.

Compound A8 has nine carbon atoms in the main chain, that is, a larger number of carbon atoms as compared with compound A1. Other structure is the same as compound A1.

The electrolytic solution of sample A9 is prepared as follows. Firstly, compound A9 shown in Table 1 and water are mixed with ethylene glycol. The mixture is then heated to a temperature of 100° C. or less and dissolved. Thereafter, the mixture is cooled to the ordinary temperature. The mixing weight ratio of ethylene glycol:compound A9:water is 88:10:2.

Compound A9 is a secondary carboxylic acid having six carbon atoms in the main chain, in which a carboxyl group (—COOH) is bonded to each terminal carbon, a kind of carboxy ester group (—COOCH$_3$) is bonded to one of the terminal carbons of the main chain, and an isopropyl group (—C$_3$H$_7$) is bonded to the other terminal carbon.

For comparison with these samples, electrolytic solutions of sample B1 and sample B2 are prepared.

The electrolytic solution of sample B1 is prepared in the same way as the electrolytic solution of sample A1 except that compound B1 is used instead of compound A1.

Compound B1 is a secondary carboxylic acid having six carbon atoms in the main chain, in which a carboxyl group (—COOH) is bonded to each terminal carbon, and an ethyl group (—C$_2$H$_5$) is bonded to the each terminal carbon of the main chain. That is to say, compound B1 is different from compound A1 in that a hydroxyl group (—OH) is not bonded to one of the carbons of the main chain.

The electrolytic solution of sample B2 is prepared in the same way as the electrolytic solution of sample A1 except that compound B2 is used instead of compound A1.

Compound B2 is primary carboxylic acid having six carbon atoms in the main chain, in which a carboxyl group (—COOH) is bonded to each terminal carbon, and a hydroxyl group (—OH) is bonded to one of the carbons of the main chain. That is to say, compound B2 is different from compound A1 in that an ethyl group (—C$_2$H$_5$) is not bonded to the each terminal carbon of the main chain.

The electrolytic solutions of samples A1 to A9 and samples B1 and B2 are heated in an ample at 110° C. for 1000 hours. The electric conductivity is measured before and after the heating test so as to calculate the change in the electric conductivity before and after the heating test. Furthermore, the presence of precipitate in the electrolytic solution after the heating test is examined. The results are shown in Table 2.

TABLE 2

| Sample | Electric conductivity before heating test (mS/cm) | Change in electric conductivity by heating test (%) | Precipitate |
|---|---|---|---|
| A1 | 2.4 | −14 | Not generated |
| A2 | 2.8 | −16 | Not generated |
| A3 | 2.4 | −14 | Not generated |
| A4 | 2.3 | −10 | Not generated |
| A5 | 2.4 | −12 | Not generated |
| A6 | 2.0 | −5 | Not generated |
| A7 | 2.3 | −12 | Not generated |
| A8 | 2.1 | −15 | Not generated |
| A9 | 1.9 | −15 | Not generated |
| B1 | 2.4 | −20 | Generated |
| B2 | 2.8 | −45 | Not generated |

As is apparent from Table 2, as compared with the electrolytic solution of sample B1, the generation of precipitate after the heating test is suppressed in the electrolytic solutions of samples A1 to A9. Furthermore, the change in the electric conductivity is reduced. Furthermore, as compared with the electrolytic solution of sample B2, the change in the electric conductivity is remarkably reduced.

Next, specific examples of electrolytic capacitors using these electrolytic solutions are described. The electrolytic capacitor of sample A1 is produced as follows. Firstly, an aluminum foil having a size of 200 mm×17 mm×0.1 mm is subjected to etching treatment, and chemical treatment in an aqueous solution of ammonium borate so as to form an oxide film. Thus, anode foil 12A is produced. On the other hand, an aluminum foil having a size of 240 mm×17 mm×0.03 mm is subjected to etching treatment, and thus cathode foil 12B is produced.

Next, end portions 11A of lead wires 11 made of aluminum are bonded to anode foil 12A and cathode foil 12B by swaging, respectively. Then, anode foil 12A and cathode foil 12B are wound with kraft paper having a size of 250 mm×20 mm×0.07 mm as separator 12C interposed therebetween. Thus, capacitor element 12 is produced.

Next, capacitor element 12 is impregnated with the electrolytic solution of sample A1, and then contained in aluminum case 13. Thereafter, a pair of lead wires 11 derived from capacitor element 12 are inserted into through-holes 14A provided in sealing body 14 including butyl rubber as a main component, and end portions 11B of lead wires 11 are derived out of sealing body 14. Sealing body 14 in this state is placed in the opening of case 13. Then, drawn part 13A is provided on the outer peripheral surface of case 13, and case 13 and sealing body 14 are subjected to drawing processing together. Thus, the opening of case 13 is sealed.

Thereafter, 500V of surge voltage is applied between end portions 11B of lead wires 11 derived out of sealing body 14 for one hour. Thus, the electrochemical treatment is carried out.

A radial-lead type aluminum electrolytic capacitor of sample A1 is produced by the above-mentioned method. The rating of this aluminum electrolytic capacitor is 450V, 18 μF.

An aluminum electrolytic capacitor of sample A2 is produced in the same way as the aluminum electrolytic capacitor of sample A1 except that the electrolytic solution of sample A2 is used instead of the electrolytic solution of sample A1. Hereinafter, the aluminum electrolytic capacitors of samples A3 to A8 and samples B1 and B2 are produced in the same way by varying electrolytic solutions.

Twenty each of the aluminum electrolytic capacitors of samples A1 to A9 and samples B1 and B2 produced as mentioned above are subjected to a ripple current load test at 105° C. for 5000 hours. The property data before and after the test are shown in Table 3.

TABLE 3

| | Before test | | After test | |
|---|---|---|---|---|
| Sample | Capacity (μF) | ESR (Ω) | Change in capacity (%) | Change in ESR (%) |
| A1 | 17.8 | 2.0 | −1.0 | 30 |
| A2 | 17.8 | 1.8 | −0.8 | 32 |
| A3 | 18.0 | 2.0 | −0.8 | 30 |
| A4 | 17.9 | 2.0 | −1.2 | 15 |
| A5 | 18.0 | 2.0 | −1.0 | 25 |
| A6 | 17.8 | 2.3 | −1.0 | 10 |
| A7 | 17.9 | 2.0 | −0.8 | 25 |
| A8 | 17.8 | 1.9 | −1.1 | 30 |
| A9 | 18.0 | 2.1 | −1.0 | 25 |
| B1 | 17.8 | 2.1 | −30.0 | 40 |
| B2 | 18.0 | 1.7 | −2.0 | 300 |

ESR is a value measured at 120 Hz. Table 3 shows average values of 20 measurement values. As is apparent from Table 3, the aluminum electrolytic capacitors of samples A1 to A9 show smaller change in the ESR and the capacity after the high-temperature ripple current load test as compared with the aluminum electrolytic capacitors samples B1 and B2.

Compound B1 is a carboxylic acid represented by general formula (A) used in a conventional technology. In this electrolyte, it is though that the esterification reaction and the amidation reaction at high temperatures cannot be completely suppressed, and these reactions gradually proceed at high temperatures. The compounds produced by these reactions have a high hydrophobic property. As a result, in the test of only electrolytic solution, precipitate is generated as shown in Table 2. It is though that these precipitates are accumulated on the interface between anode foil 12A or cathode foil 12B and the electrolytic solution, resulting in increasing the electric resistance on the interface between anode foil 12A or cathode foil 12B and the electrolytic solution. The increase in the electrical resistance is thought to cause the increase in the ESR. In particular, the ESR in the low frequency region is remarkably increased.

Furthermore, in compound B2, only a carboxyl group is bonded to each terminal carbon of the main chain and no substituent is bonded. Therefore, at high temperatures, the carboxyl group is susceptible to the esterification reaction, reducing the conductivity of the electrolytic solution remarkably. Thus, ESR is increased. However, since a hydroxyl group is bonded to a carbon of the main chain, it is thought that precipitate is not generated, so that the capacity change is not so much affected.

As mentioned above, the electrolytic solutions of the present embodiment include a carboxylic acid as an electrolyte. In this carboxylic acid, at least one or more of substituents together with a carboxyl group are bonded to each terminal carbon of the main chain. The substituent bonded to each terminal carbon of the main chain has a hydrophilic property, and/or a hydrophilic substituent is bonded to at least one carbon other than the both terminal carbons of the main chain. That is to say, a carboxylic acid has a structure in which a hydrophilic substituent is bonded to at least one of carbons of the main chain. With this structure, a steric hindrance function of suppressing the esterification reaction of the carboxyl group and a function of suppressing precipitate due to partial progress of the hydrophobic property are exhibited as a synergetic effect. As a result, in the electrolytic capacitor using the electrolytic solution, the change over time in the ESR is remarkably reduced in a high temperature environment. The same effect can be obtained when a salt of the above-mentioned carboxylic acid or a mixture of carboxylic acid and a salt thereof is used.

As mentioned above, when an electrolytic solution according to the present invention is used for an electrolytic capacitor, the increase over time in the ESR in a high temperature environment can be suppressed. Therefore, the electrolytic solution can be applied to a highly reliable electrolytic capacitor that requires a high heat-resisting property, a high ripple current property, and a long lifetime.

What is claimed is:

1. An electrolytic solution for an electrolytic capacitor, comprising:
    a solvent; and
    an electrolyte dissolved in the solvent,
    wherein the electrolyte includes at least one of a carboxylic acid and a salt of the carboxylic acid,
    the carboxylic acid has terminal carbons and middle carbons in a straight main chain,
    the carboxylic acid has a carboxyl group and a terminal substituent in each of the terminal carbons,
    wherein at least one of the terminal substituents is hydrophilic, and both the at least one terminal hydrophilic substituent and at least one of the carboxyl groups are directly bonded to each of the terminal carbons.

2. The electrolytic solution for an electrolytic capacitor according to claim 1, wherein the hydrophilic terminal substituent is any one of a hydroxyl group, a carboxyl group, an acyl group, a carboxy ester group, and an alkyl ether group.

3. The electrolytic solution for an electrolytic capacitor according to claim 1, wherein at least one of the middle carbons has a hydrophilic substituent.

4. The electrolytic solution for an electrolytic capacitor according to claim 3, wherein the hydrophilic substituent of the middle carbons is any one of a hydroxyl group, a carboxyl group, an acyl group, a carboxy ester group, and an alkyl ether group.

5. An electrolytic capacitor, comprising:
    a capacitor element including an anode having a dielectric layer on a surface thereof, a cathode, and a separator interposed between the anode and the cathode; and
    an electrolytic solution impregnated in the capacitor element,
    wherein the electrolytic solution includes a solvent and an electrolyte dissolved in the solvent,
    the electrolyte includes at least one of a carboxylic acid and a salt of the carboxylic acid,
    the carboxylic acid has terminal carbons and middle carbons in a straight main chain,
    the carboxylic acid has a carboxyl group and a terminal substituent in each of the terminal carbons,
    wherein at least one of the terminal substituents is hydrophilic, and both the at least one terminal hydrophilic substituent and at least one of the carboxyl groups are directly bonded to each of the terminal carbons.

6. The electrolytic capacitor according to claim 5, wherein the hydrophilic terminal substituent is any one of a hydroxyl group, a carboxyl group, an acyl group, a carboxy ester group, and an alkyl ether group.

7. The electrolytic capacitor according to claim 5, wherein at least one of the middle carbons has a hydrophilic substituent.

8. The electrolytic capacitor according to claim 7, wherein the hydrophilic substituent of the middle carbons is any one of a hydroxyl group, a carboxyl group, an acyl group, a carboxy ester group, and an alkyl ether group.

* * * * *